(12) United States Patent
Zhao et al.

(10) Patent No.: US 11,387,443 B1
(45) Date of Patent: Jul. 12, 2022

(54) SILICON BASED LITHIUM ION BATTERY AND IMPROVED CYCLE LIFE OF SAME

(71) Applicant: ENEVATE CORPORATION, Irvine, CA (US)

(72) Inventors: Hong Zhao, Aliso Viejo, CA (US); Younes Ansari, Irvine, CA (US); Vincent Giordani, Irvine, CA (US); Mya Le Thai, Irvine, CA (US); Qing Zhang, Irvine, CA (US); Benjamin Park, Mission Viejo, CA (US)

(73) Assignee: ENEVATE CORPORATION, Irvine, CA (US)

( * ) Notice: Subject to any disclaimer, the term of this patent is extended or adjusted under 35 U.S.C. 154(b) by 0 days.

(21) Appl. No.: 17/532,739

(22) Filed: Nov. 22, 2021

Related U.S. Application Data

(62) Division of application No. 17/532,549, filed on Nov. 22, 2021.

(51) Int. Cl.
| | |
|---|---|
| *H01M 4/1395* | (2010.01) |
| *H01M 4/134* | (2010.01) |
| *H01M 4/38* | (2006.01) |
| *H01M 4/62* | (2006.01) |
| *H01M 10/0525* | (2010.01) |
| *H01M 10/42* | (2006.01) |
| *H01M 4/02* | (2006.01) |

(52) U.S. Cl.
CPC .......... *H01M 4/134* (2013.01); *H01M 4/386* (2013.01); *H01M 4/621* (2013.01); *H01M 10/0525* (2013.01); *H01M 2004/021* (2013.01); *H01M 2004/027* (2013.01); *H01M 2010/4292* (2013.01)

(58) Field of Classification Search
CPC ...... H01M 4/134; H01M 4/386; H01M 4/621; H01M 10/0525; H01M 2004/021; H01M 2004/027; H01M 2010/4292
See application file for complete search history.

(56) References Cited

U.S. PATENT DOCUMENTS

| | | |
|---|---|---|
| 3,990,098 A | 11/1976 | Mastrangelo |
| 4,435,444 A | 3/1984 | Goldberger et al. |
| | (Continued) | |

FOREIGN PATENT DOCUMENTS

| | | |
|---|---|---|
| CN | 1667855 | 9/2005 |
| CN | 101095251 | 12/2007 |
| | (Continued) | |

OTHER PUBLICATIONS

Machine translation of CN 111370656, retrieved from <www.espacenet.com> on Feb. 7, 2022.*

(Continued)

*Primary Examiner* — Cynthia K Walls

(74) *Attorney, Agent, or Firm* — McAndrews, Held & Malloy, Ltd.

(57) ABSTRACT

Silicon-dominate battery electrodes, battery cells utilizing the silicon-dominate battery electrodes, and methods of manufacturing are disclosed. Such a battery cell includes a cathode, a separator, an electrolyte, and an anode. The anode comprises a current collector and active material on the (Continued)

current collector. The active material layer includes at least 50% silicon. A ratio of the electrolyte to Ah is over 2 g/Ah.

38 Claims, 14 Drawing Sheets

(56) References Cited

U.S. PATENT DOCUMENTS

| | | | |
|---|---|---|---|
| 4,526,610 A | 7/1985 | Miura et al. | |
| 5,429,866 A | 7/1995 | Dubrous | |
| 5,624,606 A | 4/1997 | Wilson et al. | |
| 6,287,728 B1 | 9/2001 | Kajiura et al. | |
| 6,300,013 B1 | 10/2001 | Yamada et al. | |
| 6,413,672 B1 | 7/2002 | Suzuki et al. | |
| 6,432,579 B1 | 8/2002 | Tsuji et al. | |
| 6,436,576 B1 | 8/2002 | Hossain | |
| 6,489,061 B1 | 12/2002 | Hossain | |
| 6,589,696 B2 | 7/2003 | Matsubara et al. | |
| 6,743,549 B1 | 6/2004 | Doyle et al. | |
| 6,770,399 B2 | 8/2004 | Umeno et al. | |
| 6,946,223 B2 | 9/2005 | Kusumoto et al. | |
| 6,949,314 B1 | 9/2005 | Hossain | |
| 7,037,581 B2 | 5/2006 | Aramata et al. | |
| 7,202,000 B2 | 4/2007 | Iriyama et al. | |
| 7,303,838 B2 | 12/2007 | Morita et al. | |
| 7,316,792 B2 | 1/2008 | Kosuzu et al. | |
| 7,615,314 B2 | 11/2009 | Kawakami et al. | |
| 7,670,970 B2 | 3/2010 | Ko | |
| 8,158,285 B2 | 4/2012 | Im et al. | |
| 8,288,039 B2 | 10/2012 | Im et al. | |
| 8,372,549 B2 | 2/2013 | Im et al. | |
| 8,603,683 B2 | 12/2013 | Park et al. | |
| 8,709,653 B2 | 4/2014 | Lee et al. | |
| 9,178,208 B2 | 11/2015 | Park et al. | |
| 9,397,338 B2 | 7/2016 | Park et al. | |
| 9,553,303 B2 | 1/2017 | Park et al. | |
| 9,583,757 B2 | 2/2017 | Park et al. | |
| 9,608,262 B2 | 3/2017 | Aramata et al. | |
| 9,620,809 B2 | 4/2017 | Turon Teixidor et al. | |
| 9,647,259 B2 | 5/2017 | Park et al. | |
| 9,806,328 B2 | 10/2017 | Park et al. | |
| 9,941,509 B2 | 4/2018 | Park et al. | |
| 9,997,765 B2 | 6/2018 | Park | |
| 10,103,378 B2 | 10/2018 | Park et al. | |
| 10,622,620 B2 | 4/2020 | Park et al. | |
| 2002/0009646 A1 | 1/2002 | Matsubara et al. | |
| 2004/0137327 A1 | 7/2004 | Gross et al. | |
| 2005/0014072 A1 | 1/2005 | Yamaguchi et al. | |
| 2005/0031958 A1 | 2/2005 | Fukuoka et al. | |
| 2005/0089755 A1 | 4/2005 | Matsubara | |
| 2005/0233213 A1 | 10/2005 | Lee et al. | |
| 2006/0003227 A1 | 1/2006 | Aramata | |
| 2006/0035146 A1 | 2/2006 | Hayashi et al. | |
| 2006/0035149 A1 | 2/2006 | Nanba | |
| 2006/0040182 A1 | 2/2006 | Kawakami et al. | |
| 2006/0051670 A1 | 3/2006 | Aramata et al. | |
| 2006/0051675 A1 | 3/2006 | Musha et al. | |
| 2006/0068287 A1 | 3/2006 | Morita et al. | |
| 2006/0127773 A1 | 6/2006 | Kawakami et al. | |
| 2006/0134516 A1 | 6/2006 | Im et al. | |
| 2006/0147799 A1 | 7/2006 | Hayashi et al. | |
| 2006/0147802 A1 | 7/2006 | Yasuda et al. | |
| 2006/0275668 A1 | 12/2006 | Peres et al. | |
| 2007/0054190 A1 | 3/2007 | Fukui et al. | |
| 2007/0072074 A1 | 3/2007 | Yamamoto et al. | |
| 2007/0072084 A1 | 3/2007 | Nishie et al. | |
| 2007/0077490 A1 | 4/2007 | Kim et al. | |
| 2007/0141466 A1* | 6/2007 | Shimamura | H01M 4/42 429/229 |
| 2007/0154811 A1 | 7/2007 | Oh et al. | |
| 2007/0212610 A1 | 9/2007 | Sonobe et al. | |
| 2007/0243469 A1 | 10/2007 | Kim et al. | |
| 2007/0281216 A1 | 12/2007 | Petrat et al. | |
| 2008/0020282 A1 | 1/2008 | Kim et al. | |
| 2008/0102370 A1 | 5/2008 | Kashiwagi | |
| 2008/0145757 A1 | 6/2008 | Mah et al. | |
| 2008/0145761 A1 | 6/2008 | Petrat et al. | |
| 2008/0160409 A1 | 7/2008 | Ishida et al. | |
| 2008/0280207 A1 | 11/2008 | Patoux et al. | |
| 2008/0286657 A1 | 11/2008 | Hasegawa et al. | |
| 2009/0004566 A1 | 1/2009 | Shirane et al. | |
| 2009/0023065 A1 | 1/2009 | Hwang | |
| 2009/0029256 A1 | 1/2009 | Mah et al. | |
| 2009/0053589 A1 | 2/2009 | Obrovac et al. | |
| 2009/0053608 A1 | 2/2009 | Choi et al. | |
| 2009/0087743 A1 | 4/2009 | Kim et al. | |
| 2009/0117467 A1 | 5/2009 | Zhamu et al. | |
| 2009/0117468 A1 | 5/2009 | Eom | |
| 2009/0181304 A1 | 7/2009 | Miyamoto et al. | |
| 2009/0186267 A1 | 7/2009 | Tiegs | |
| 2009/0202911 A1 | 8/2009 | Fukuoka et al. | |
| 2009/0239151 A1 | 9/2009 | Nakanishi et al. | |
| 2009/0283875 A1 | 11/2009 | Garandet et al. | |
| 2009/0305135 A1 | 12/2009 | Shi et al. | |
| 2009/0317722 A1 | 12/2009 | Watanabe | |
| 2010/0078599 A1 | 4/2010 | Kumta et al. | |
| 2010/0143798 A1 | 6/2010 | Zhamu et al. | |
| 2010/0255376 A1 | 10/2010 | Park et al. | |
| 2010/0266902 A1 | 10/2010 | Takano et al. | |
| 2010/0273058 A1 | 10/2010 | Lee et al. | |
| 2011/0020701 A1 | 1/2011 | Park et al. | |
| 2011/0045360 A1 | 2/2011 | Deguchi | |
| 2011/0135558 A1 | 6/2011 | Ma et al. | |
| 2011/0177393 A1 | 7/2011 | Park et al. | |
| 2011/0244333 A1 | 10/2011 | Kawada | |
| 2012/0094178 A1 | 4/2012 | Loveridge et al. | |
| 2012/0202069 A1 | 8/2012 | Aoki | |
| 2012/0210823 A1 | 8/2012 | Lee et al. | |
| 2013/0015238 A1* | 1/2013 | Studer | B66B 1/3492 235/375 |
| 2014/0147751 A1 | 5/2014 | Yang et al. | |
| 2014/0170482 A1 | 6/2014 | Park et al. | |
| 2014/0170498 A1 | 6/2014 | Park | |
| 2015/0118567 A1 | 4/2015 | Chen | |
| 2015/0325848 A1 | 11/2015 | Yamashita et al. | |
| 2017/0040598 A1 | 2/2017 | Wang et al. | |
| 2017/0133665 A1 | 5/2017 | Park | |
| 2017/0133670 A1 | 5/2017 | Park | |
| 2017/0155126 A1 | 6/2017 | Park | |
| 2017/0170510 A1 | 6/2017 | Turon Teixidor et al. | |
| 2017/0207484 A1* | 7/2017 | Zhamu | H01M 10/0525 |
| 2017/0279093 A1 | 9/2017 | Park | |
| 2017/0365845 A1 | 12/2017 | Moon | |
| 2018/0062154 A1 | 3/2018 | Park et al. | |
| 2018/0198114 A1 | 7/2018 | Bonhomme et al. | |
| 2018/0219211 A1 | 8/2018 | Park et al. | |
| 2018/0226642 A1 | 8/2018 | Wang et al. | |
| 2018/0287129 A1 | 10/2018 | Park | |
| 2020/0014019 A1 | 1/2020 | Kim et al. | |
| 2021/0143390 A1* | 5/2021 | Park | H01M 4/386 |

FOREIGN PATENT DOCUMENTS

| | | | |
|---|---|---|---|
| CN | 102834955 | 12/2012 | |
| CN | 111370656 | * 7/2020 | ........ H01M 10/0525 |
| EP | 1 054 462 | 11/2000 | |
| EP | 1 363 341 | 11/2003 | |
| EP | 1 722 429 | 11/2006 | |
| EP | 2 113 955 | 11/2009 | |
| JP | 2000-173667 | 6/2000 | |
| JP | 2000-272911 | 10/2000 | |
| JP | 2001-006682 | 1/2001 | |
| JP | 2001-160392 | 6/2001 | |
| JP | 2003-165715 | 6/2003 | |
| JP | 2004-103405 | 4/2004 | |
| JP | 2005-285382 | 10/2005 | |
| JP | 2007-073334 | 3/2007 | |
| JP | 2007-165061 | 6/2007 | |
| JP | 2008-153006 | 7/2008 | |
| JP | 2009-026760 | 2/2009 | |
| KR | 2009-0109225 | 10/2009 | |
| WO | 1998028804 | 7/1998 | |
| WO | 2011088472 | 7/2011 | |
| WO | 2012126338 | 9/2012 | |

(56) References Cited

FOREIGN PATENT DOCUMENTS

| WO | 2014007161 | 1/2014 |
|---|---|---|
| WO | 2014158729 | 10/2014 |
| WO | 2017027263 | 2/2017 |

OTHER PUBLICATIONS

Bogart et al., "High Capacity Lithium Ion Battery Anodes of Silicon and Germanium," Current Opinion in Chemical Engineering, 2013, vol. 2, pp. 1-8.

Choi et al., "Effect of Fluoroethylene Carbonate Additive on Interfacial Properties of Silicon Thin-Film Electrode," Journal of Power Sources, 2006, vol. 161, pp. 1254-1259.

Choi et al., "Enhanced Electrochemical Properties of a Si-based Anode Using an Electrochemically Active Polyamide Imide Binder," Journal of Power Sources, 2008, vol. 177, pp. 590-594.

Datta, et al., "Silicon, Graphite and Resin Based Hard Carbon Nanocomposite Anodes for Lithium Ion Batteries," Journal of Power Sources, Feb. 10, 2007, vol. 165, No. 1, pp. 368-378.

Gilman et al., "Chapter 11 Thermal Decomposition Chemistry of Poly(vinyl alcohol)," in Fire and Polymers II: Materials and Test for Hazard Prevention, American Chemical Society, ACS Symposium Series 599, Aug. 21-26, 1994, Washington, DC, pp. 161-185.

Hsu, G., "Fines in Fluidized Bed Silane Pyrolysis," Journal of the Electrochemical Society, Mar. 1984, vol. 131, No. 3, pp. 660-663.

Hu et al., "Superior Storage Performance of a Si@SiOx/C Nanocomposite as Anode Material for Lithium-Ion Batteries," Angewandte Chemie International Edition, Feb. 15, 2008, vol. 47, No. 9, pp. 1645-1649.

Ji et al., "Electrospun Carbon Nanofibers Containing Silicon Particles as an Energy-Storage Medium," Carbon, Nov. 2009, vol. 47, No. 14, pp. 3219-3226.

Lee et al., "Graphene-Silicon Composite for Li-Ion Battery Anodes," http://apps.aiche.org/proceedings/Abstracts.aspx?PaperID=162914, dated Sep. 11, 2009 [Retrieved Jun. 23, 2011].

Lee et al., "Silicon Nanoparticles-Graphene Paper Composites for Li ion Battery Anodes," Chemical Communications, 2010, vol. 46, No. 12, pp. 2025-2027.

Lin et al., "High Performance Silicon Nanoparticle Anode in Fluoroethylene Carbonate-Based Electrolyte for Li-Ion Batteries," Chemical Communications, 2012, vol. 48, pp. 7268-7270.

Ma et al., "Si-Based Anode Materials for Li-Ion Batteries: A Mini Review," Nano-Micro Letters, 2014, vol. 6, No. 4, pp. 347-358.

Na et al., "Effect of the Average Particle Size and the Surface Oxidation Layer of Silicon on the Colloidal Silica Particle Through Direct Oxidation," Materials Science and Engineering B 163, 2009, pp. 82-87.

Nakai et al., "Investigation of the Solid Electrolyte Interphase Formed by Fluoroethylene Carbonate on Si Electrodes," Journal of the Electrochemical Society, 2011, vol. 158, No. 7, pp. A798-A801.

"Pitch-based carbon fiber," Wikipedia, https://en.wikipedia.org/wiki/Pitch-based_carbon_fiber, edited Nov. 7, 2017, 3 pages.

Seo et al., "Stacking Faults in β-SiC Formed During Carbothermal Reduction of SiO2," Journal of the American Ceramic Society, 1996, vol. 79, No. 7, pp. 1777-1782.

Studart et al., "Processing Routes to Macroporous Ceramics: A Review," Journal of the American Ceramic Society, Jun. 1, 2006, pp. 1771-1789.

Su et al., "Silicon-Based Nanomaterials for Lithium-Ion Batteries: A Review" Advanced Energy Materials, 2014, vol. 4, pp. 1-23.

Sun et al., "Formation of Silicon Carbide Nanotubes and Nanowires via Reaction of Silicon (from Disproportionation of Silicon Monoxide) with Carbon Nanotubes," Journal of the American Ceramic Society, 2002, vol. 124, No. 48, pp. 14464-14471.

Wolf, H. et al., "Carbon-Fiber-Silicon Nanocomposites for Lithium-Ion Battery Anodes by Microwave Plasma Chemical Vapor Deposition," Journal of Power Sources, May 1, 2009, vol. 190, No. 1, pp. 157-161.

Zhang et al., "Heterostructures of Single-Walled Carbon Nanotubes and Carbide Nanorods," Science, Sep. 10, 1999, vol. 285, pp. 1719-1722.

Zhang, Sheng Shui, "A Review on Electrolyte Additives for Lithium-Ion Batteries," Journal of Power Sources, 2006, vol. 162, pp. 1379-1394.

Zhang, Wei-Jun., "A Review of the Electrochemical Performance of Alloy Anodes for Lithium-Ion Batteries," Journal of Power Sources, 2011, vol. 196, pp. 13-24.

Zhou et al., "Kinetics Model for the Growth of Silicon Carbide by the Reaction of Liquid Silicon with Carbon," Journal of the American Ceramic Society, 1995, vol. 78, No. 9, pp. 2456-2462.

\* cited by examiner

US 11,387,443 B1

SILICON BASED LITHIUM ION BATTERY AND IMPROVED CYCLE LIFE OF SAME

CROSS-REFERENCE TO RELATED APPLICATIONS

This application is a divisional of U.S. application Ser. No. 17/532,549, filed Nov. 22, 2021, the entirety of which is hereby incorporated by reference.

FIELD

Aspects of the present disclosure relate to energy generation and storage. More specifically, certain embodiments of the disclosure are directed to battery electrodes, battery cells, and/or batteries with improved cycle life.

BACKGROUND

A rechargeable battery experiences periods of charging and periods discharging. These charge-discharge cycles reduce a storage capacity of the of battery and thus reduce the life of the battery.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A battery and/or battery anode are substantially shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
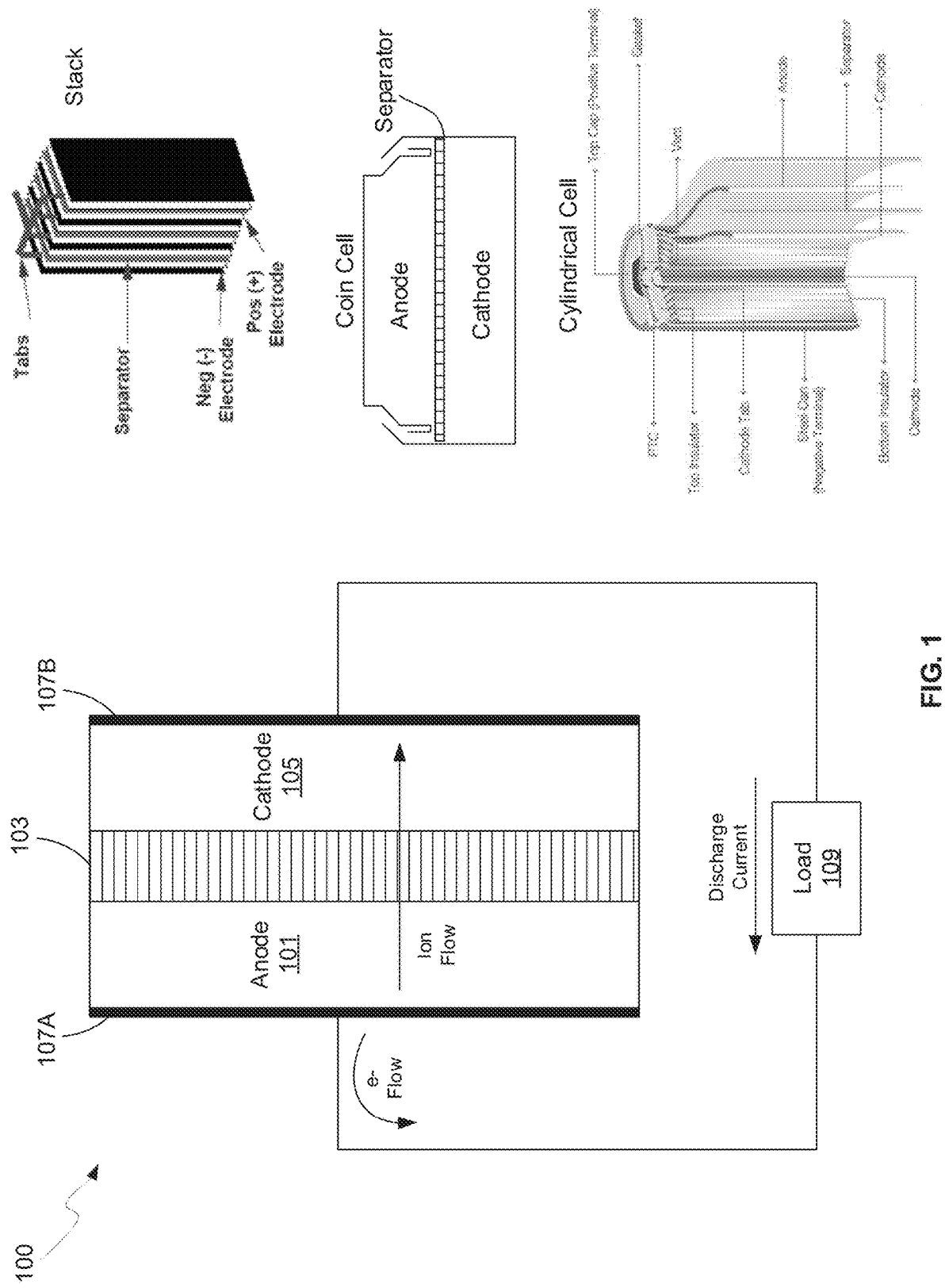
FIG. 1 is a diagram of a battery with a silicon-dominant anode, in accordance with an example embodiment of the disclosure.

FIG. 1 is a diagram of a battery with silicon-dominant anodes, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the cell shown in FIG. 1 is a very simplified example merely to show the principle of operation of a lithium ion cell. Examples of realistic structures are shown to the right in FIG. 1, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the electrode coating layer in forming electrodes.

The configuration shown in FIG. 1 illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator

103. Typically, the separator 103, cathode 105, and anode 101 materials are individually formed into sheets, films, or coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In some embodiments, one or more of the electrodes is a silicon-dominant electrode. In some embodiments, the electrode comprises a self-supporting composite material film. In some embodiments, the composite material film comprises greater than 0% and less than about 90% by weight of silicon particles, and greater than 0% and less than about 90% by weight of one or more types of carbon phases, wherein at least one of the one or more types of carbon phases is a substantially continuous phase that holds the composite material film together such that the silicon particles are distributed throughout the composite material film.

The amount of silicon in the composite material can be greater than zero percent by weight of the mixture and composite material. In certain embodiments, the mixture comprises an amount of silicon, the amount being within a range of from about 0% to about 90% by weight, such as greater than 70%, or including from about 30% to about 80% by weight of the mixture. The amount of silicon in the composite material can be within a range of from about 0% to about 35% by weight, including from about 0% to about 25% by weight, from about 10% to about 35% by weight, and about 20% by weight. In further certain embodiments, the amount of silicon in the mixture is at least about 30% by weight. Additional embodiments of the amount of silicon in the composite material include more than about 50% by weight, between about 30% and about 80% by weight, between about 50% and about 70% by weight, and between about 60% and about 80% by weight. Furthermore, the silicon particles may or may not be pure silicon. For example, the silicon particles may be substantially silicon or may be a silicon alloy. In one embodiment, the silicon alloy includes silicon as the primary constituent along with one or more other elements.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), F2EC, VC, Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, LiTFSI, LiFSI, LiDFOB, LiBOB, LiTDI, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator 103 may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram (mAh/g). Graphite, the active material used in most lithium ion battery anodes, has a theoretical energy density of 372 mAh/g. In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

Reliability and energy density of the battery 100 are dependent upon the materials selected for the anode 101 and cathode 105. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries may be achieved with the development of high-capacity and high-voltage cathodes, high-capacity anodes, and functionally non-flammable electrolytes with high voltage stability and interfacial compatibility with electrodes. In addition, materials with low toxicity are beneficial as battery materials to reduce process cost and promote consumer safety.

The performance of electrochemical electrodes are depending upon many factors including the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have may be incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. With demand for lithium-ion battery performance improvements such as higher energy density and fast-charging, silicon may be added as an active material or even completely replacing graphite as a dominant anode material. Most electrodes that are considered "silicon anodes" in the industry are graphite anodes with silicon added in small quantities (typically <20%). These graphite-silicon mixture anodes must utilize the graphite, which has a lower lithiation voltage compared to silicon; the silicon has to be nearly fully lithiated in order to utilize the graphite. Therefore, these electrodes do not have the advantage of a silicon or silicon composite anode where the voltage of the electrode is substantially above 0V vs Li/Li+ and thus are less susceptible to lithium plating. Furthermore, these electrodes can have significantly higher excess capacity on the silicon versus the opposite electrode to further increase the robustness to high rates.

Silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI formation repeatedly breaks apart and reforms. The SEI formation thus continually builds up around the pulverizing silicon regions during cycling into a thick electronic and ionic insulating layer. This accumulating SEI formation increases the impedance of the electrode and reduces the electrode electrochemical reactivity, which is detrimental to cycle life.

Therefore, there is a trade-off among the functions of active materials, conductive additives, and polymer binders. The balance may be adversely impacted by high energy density silicon anodes with low conductivity and huge volume variations described above. This disclosure address this issue through the use of primary resin carbon precursors comprising water soluble acidified polyamide-imide (PAI) (e.g. 5-8%) and various polymeric stabilizing additives such as polyacrylic acid (PAA) solution, poly (maleic acid, methyl methacrylate/methacrylic acid, butadiene/maleic acid) solutions, water soluble carboxyl acid group containing (co)polyimide solution, and other soluble polymers containing carboxyl acid groups. These polymeric stabilizing additives may assist in the stabilizing the slurry, and may also serve as a carbon source. In some embodiments, the primary resin carbon precursor comprises an aqueous solution of two or more polymers.

Further water soluble polymers that may be used as polymeric stabilizing additives include, but are not limited to, one or more of Polyamide-imide {Includes International-innotek (GT-720W, GT-721W, GT-722W), China-innotek (PIW-015, PIW-025, PIW-026), Elantas (Elan-bind 1015, Elan-bind 1015 NF), Solvay Torlon AI series (AI30, AI30-LM, AI10, AI10-LM)}; Polyimide; Ammonium Lignosulfonate; Kraft Lignin; Dextran; Pullulan (polysaccharide polymer); Phenolic resins {Includes (Plenco (Novolac Resins), Resol Resins, polymethylol phenol, ERPENE PHENOLIC RESIN (emulsion)}; Formaldehyde based Resins; Melamine-formaldehyde based resins; Silane based resins (gelest); Polyurethanes; TOCRYL (acrylic emulsion); Chitosan; Helios Resins {Includes (DOMOPOL, DOMACRYL, DOMALKYD and DOMEMUL}; Polymethyl methacrylate; Poly(methacrylic acid); Poly(vinyl acetate)/poly(vinyl alcohol) complexes; ACRONAL water-based acrylic and stryrene-acrylic emulsion polymers; STYROFAN carboxylated styrene-butadiene binders; Solic Acrylic Resin; Rotaxane; Poly(acrylic acid); Cellulose; Starch; Polysacharides; Glycogen; Carbohydrates (other); and polymers with the following backbones Sucrose, Glucose, Sucralose, Xylitol, Sorbitol, Sucralose, Glucosidases, Galactose, and Maltose.

Further additives may be used in order to modify the characteristics of the polymer solution. Suitable additives include, but are not limited to, one or more of Poly(acrylic acid), Carboxymethylcellulose (CMC), Polyvinylpyrrolidone, Myo-Inositol, Mannitol, Pinitol, Ribose, Sorbitol, Fucose, Maltodextrin, Ganglioside, Maltose, Sucrose, Glucose, Sucralose, Xylitol, Fructose, Palatinose hydrate, Dextran sucrase, Guanosine, Inulin, Sucrose phosphorylase, Glucosidases, AmberLite, Raffinose, Mannose, Psicose, Hexokinase, NADHs, Phosphoglucose, Phosphomannose, Topiramate, Furfurals, Nuciferine, Galactose, and Maltose. In some embodiments these additives may be added to the resin to increase its viscosity (e.g. by >10%) to facilitate the processing of the slurry and improve the coating quality.

Water-soluble PAI (WPAI) material has a polyamide-imide (PAI) backbone, but the polymer is functionalized with acidic groups (such as carboxylic acid) to allow the polymer to dissolve in water, so WPAI is a PAI analog with acidic functional groups added to the chemical formula. Water soluble PAI is similar in chemical structure to PAI, however acid groups such as carboxylic acid or amic acid are embedded into the polymer backbone.

Water-soluble acidified PAI and water-based acidic polymer solution additive anodes provide the benefits of improved cycle life, increased energy density, increased power density, improved flexibility, improved adhesion, and reduced cost. Water-soluble acidified PAI and water-based acidic polymer solution additive electrodes may also provide improved safety. WPAI polymers can contain water; for example, WPAI polymer can have a water content of 45-75%, in some embodiments, the water content is 65%. Additional water may still be needed to dissolve the polymer above the water content already present in the polymer.

As discussed above, water soluble acidified PAI is a WPAI having a PAI backbone, functionalized with acidic groups to allow the polymer to dissolve in water. Acidic functional groups that may be used to functionalize PAI include, but are not limited to, one or more of Amic acid, Butane tetracarboxylic acid (BTC), Tetracarboxylic acid (TC), Carboxylic acid, Licanic acid, Methacrylic acid, Acetic acid, Aminomethanesulfonic acid, Anthranilic acid, Benzenesulfonic acid, Benzoic acid, Camphor-10-sulfonic acid, Citric acid, Folic acid, Formic acid, Fumaric acid, Gallic acids, Lactic acid, Maleic acid, Malonic acid, Methanesulfonic acid, Nitrilotriacetic acid, Oxalic acid, Peracetic acid, Phthalic acid, Propionic acid, Salicylic acid, Sorbic acid, Succinic acid, Sulfamic acid, Sulfanilic acid, Tannic acid, Thioacetic acid, Trifluoromethanesulfonic acid, Acrylic acids, Aminophenylboronic acid, and Fuconic acid. In further embodiments, non-acidic groups may be used to functionalize the PAI such as Phosphates (including phosphate esters and phosphate diesters), Ranirestat, and Phosphatase.

Figure 2A:
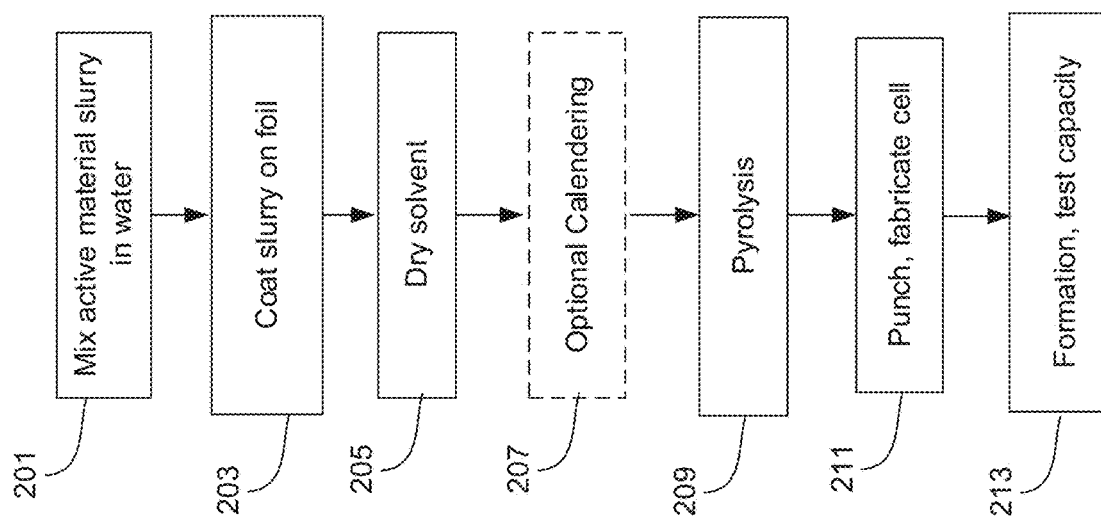
FIG. 2A is a flow diagram of a direct coating process for fabricating a cell with a silicon-dominant electrode, in accordance with an example embodiment of the disclosure.

FIG. 2A is a flow diagram of a direct coating process for fabricating a cell with a silicon-dominant electrode, in accordance with an example embodiment of the disclosure. This process comprises physically mixing the electrode coating layer and conductive additive together, and coating it directly on a current collector as opposed to forming the electrode coating layer on a substrate and then laminating it on a current collector. This strategy may also be adopted by other anode-based cells, such as graphite, conversion type anodes, such as transition metal oxides, transition metal phosphides, and other alloy type anodes, such as Sn, Sb, Al, P, etc.

In step 201, the raw electrode coating layer may be mixed to form a slurry with stable viscosities of more than 1500 cp by using water-soluble acidified PAIs (WPAI) and water-based acidic polymer solution additives. The addition of the polymer solution additive enables the adjustment of the viscosity of the polymer and homogenization of the slurry. The fabricated anode shows superior adhesion to copper, a remarkable cohesion, and exceptional flexibility. This anode is shown to be capable of fast charging and performs similar or better than current anodes.

The particle size and mixing times may be varied to configure the electrode coating layer density and/or roughness. Furthermore, cathode electrode coating layers may be mixed in step 201, where the electrode coating layer may comprise lithium cobalt oxide (LCO), lithium iron phosphate, lithium nickel cobalt manganese oxide (NMC), Ni-rich lithium nickel cobalt aluminum oxide (NCA), lithium manganese oxide (LMO), lithium nickel manganese spinel, LFP, Li-rich layer cathodes, LNMO or similar materials or combinations thereof, mixed with carbon precursor and additive as described above for the anode electrode coating layer.

As described herein, aqueous-based polyamide-imide resins used to fabricate silicon dominant anodes are disclosed. Environmentally friendly bases may be used in the slurry and stabilizers may also be used. In some embodiments, water soluble PAI (5-20% in water) is used as a carbon source (precursor), triethanolamine is used as base and PAA as stabilizer to create high silicon content anodes.

The slurry may be made in water and may have varying composition. In one embodiment, the slurry may contain one or more of the following components in the following ranges:

DI water: 30-70%
Polymer solids: between 5-35%
Base: less than 30%
Acid: less than 25%
Surfactant: less than 5%
Other polymer additives: less than 40%.

Bases that can be used in the slurry include, but are not limited to, one or more of Triethanolamine, Triethylamine, N-Methyldiethanolamine, Butyldiethanolamine, Diethylamine, Ethylamine, Tetrabutylammonium hydroxide, Tetramethylammonium hydroxide, Tetramethylammonium hydroxide, Triisopropanolamine, Trolamine, Amino-2-propanol, Triisobutylamine, N-Isopropyl-N-methyl-tert-butylamine, 2-Amino-2-methyl-1-propanol, 1-Amino-2-butanol, 2-Amino-1-butanol, Diethanolamine, Ethanolamine, 2-Dimethylaminoethanol, N-Phenyldiethanolamine, 2-(Dibutylamino)ethanol, 2-(Butylamino)ethanol, N-tert-Butyldiethanolamine, N-Ethyldiethanolamine, Avridine, and 2-(Diisopropylamino)ethanol.

In some embodiments, aqueous-based polyamide-imide resins are used to create a slurry containing an environmentally friendly base (such as triethanolamine) along with polyacrylic acid (PAA). In this slurry, PAI is used as the main carbon source, triethanolamine as the base, and PAA both as the slurry stabilizer and as carbon source. The environmentally friendly base (such as triethanolamine) is a non-corrosive amine base which facilitates the dissolution of the PAI in water.

In some embodiments, the slurry contains an optional surfactant. Addition of a surfactant may improve the coating quality. Suitable surfactants include, but are not limited to, octyltrimethylammonium bromide, dodecyltrimethylammonium bromide, cetyltrimethylammonium bromide, Polyvinylpyrrolidone α-fluoro homoallylic alcohols, α-Cyclodextrin, TritonX-100, FluorN 561 and FluorN 562, ETI 929 (from EnvTech), alkyl glycosides, and TEGO® Surten E.

Figure 3:
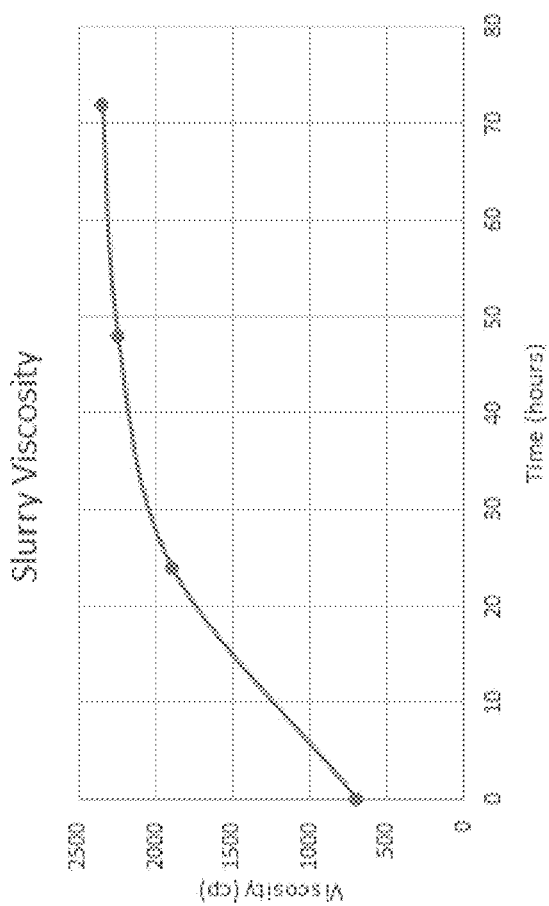
FIG. 3 illustrates slurry viscosity versus mixing time, in accordance with an example embodiment of the disclosure.

In an example embodiment, for a silicon-dominant anode, 30-40 grams of dry WPAI, 15-25 grams of a basic amine such as butyldiethanolamine or triethanolamine, and 400-500 grams of water may be mixed at high temperature to form a solution. Then, 30-50 grams of this solution may be mixed with 5-20 grams of silicon microparticles (~10-12 μm) plus 0.2-0.5 grams of PAA 12% solution in water as additive, and 4-8 grams of water. The mixture may be mixed using a low shear mixer or a centrifugal speed mixer, where FIG. 3 shows the changes in the viscosity of the solution versus mixing time.

In a further example embodiment, for a silicon-dominant anode, a WPAI solution was made using the following example formulation in Table 1.

TABLE 1

| WPAI solution | grams |
|---|---|
| WPAI polymer | 100 |
| Water | 458 |
| triethanolamine | 27 |

To prepare the WPAI solution, 100 grams of the polymer powder (water content 45-75%) may be dissolved in a mixture of 458 grams of DI water and 27 grams of triethanolamine. Then the temperature of the mixture may be raised to >80° C. under vigorous stirring overnight to allow the polymer to dissolve in the solution. Then the solution may be filtered to form the WPAI solution used to make the slurry.

In another example embodiment, WPAI-resin may be used to make a slurry with various formulations having different types of silicon to illustrate that different silicon particles may be used. The formulation of the slurry was as follows in Table 2.

TABLE 2

| Si | 20.92% |
|---|---|
| PAI-resin | 66.90% |
| Polyacrylic acid (12% in water) - | |
| PAA | 12.07% |
| surfactant | 0.10% |

To prepare the slurries with different silicon particles, silicon powders with different particle size (D50 of 5 μm and D50 of 12 μm) may be added to a solution of the resin pre-mixed with the surfactant in the proportions set forth above in Table 2. Then PAA solution may be added to the mixture and further mixed to form the slurry.

Figure 8:
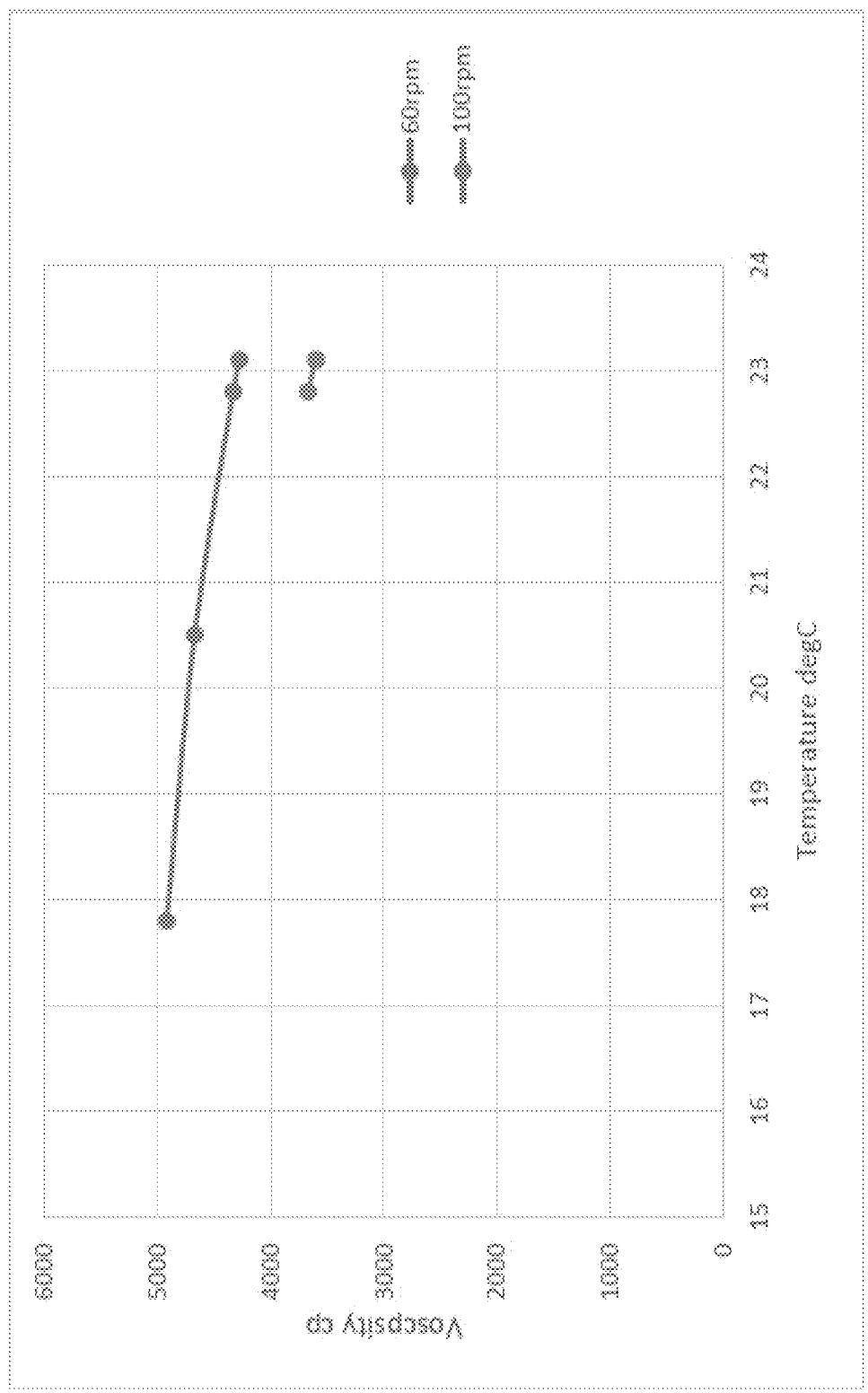
FIG. 8 illustrates slurry viscosity versus temperature, in accordance with an example embodiment of the disclosure.

Three separate slurries may be prepared using the Table 2 formulation with the following silicon powders:
Sample 1: Silicon powder with D50 of 12 μm
Sample 2: Silicon powder with D50 of 12 μm (80%) and D50 of 5 μm (20%)
Sample 3: Silicon powder with D50 of 5 μm.
FIG. 8 shows the changes in the viscosity of the solution versus temperature for Sample 3, above.

In step 203, the as-prepared slurry may be coated on a copper foil, 20 μm thick in this example, and in step 205 may be dried at 130° C. in a convection oven to dry the coating and form the green anode. Similarly, cathode electrode coating layers may be coated on a foil material, such as aluminum, for example.

An optional calendering process may be utilized in step 207 where a series of hard pressure rollers may be used to finish the film/substrate into a smoother and denser sheet of material.

Figure 9:
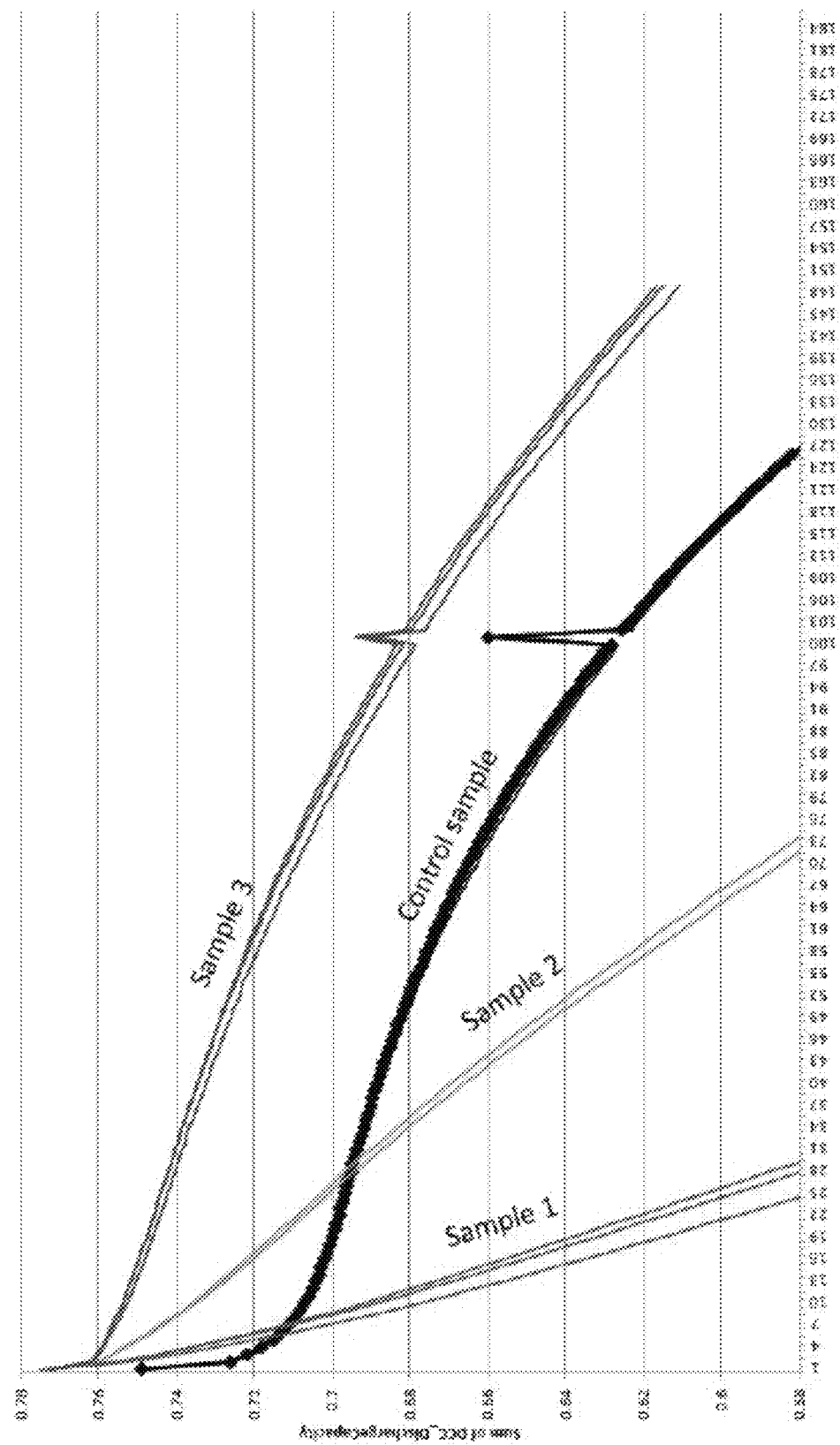
FIG. 9 illustrates electrochemical performance of anodes in pouch cells, in accordance with an example embodiment of the disclosure.

The slurries from Samples 1-3 above may be coated separately on 15 μm copper foils and pyrolyzed under Argon gas at 650° C. for 3 hours to form silicon dominant anodes. Testing may be performed between 4.2V-2V using the sample anodes and NMC cathode. The electrochemical performance of the anodes in pouch cells is shown in FIG. 9.

In step 209, the electrode coating layer may be pyrolyzed by heating to 500-800° C., 650° C. in this example, in an inert atmosphere such that carbon precursors are partially or completely converted into conductive carbon. The pyrolysis step may result in an anode electrode coating layer having silicon content greater than or equal to 50% by weight, where the anode has been subjected to heating at or above 400 degrees Celsius. In one embodiment the pyrolysis conditions may be between 450-800° C., under Argon, Nitrogen, or Forming gas.

Pyrolysis can be done either in roll form or after punching in step 211. If done in roll form, the punching is done after the pyrolysis process. In instances where the current collector foil is not pre-punched/pre-perforated, the formed electrode may be perforated with a punching roller, for example. The punched electrodes may then be sandwiched with a separator and electrolyte to form a cell. In step 213, the cell may be subjected to a formation process, comprising initial charge and discharge steps to lithiate the anode, with some residual lithium remaining, and the cell capacity may be assessed.

Figure 2B:
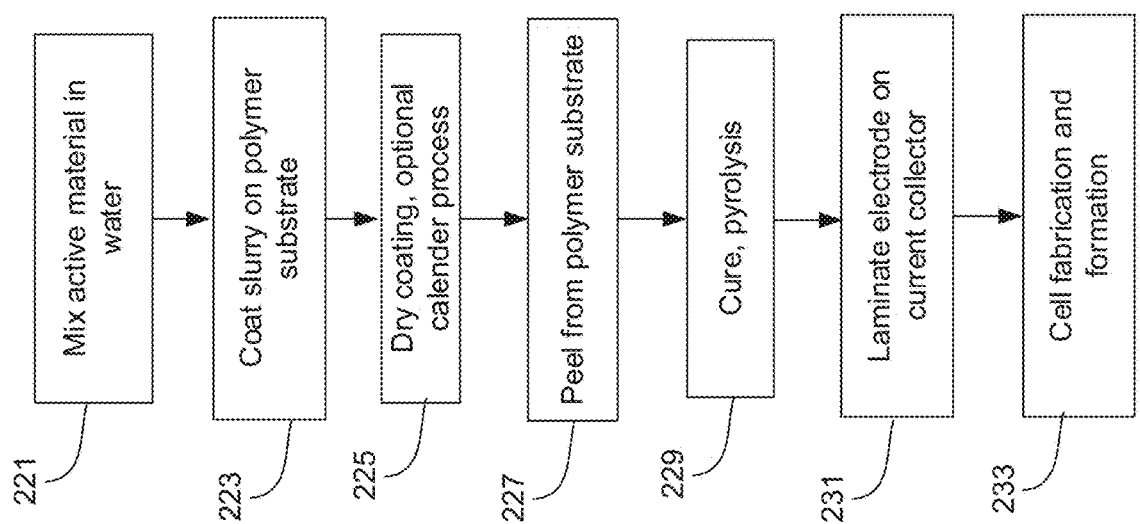
FIG. 2B is a flow diagram for of an alternative process for lamination of electrodes, in accordance with an example embodiment of the disclosure.

FIG. 2B is a flow diagram of an alternative process for lamination of electrodes, in accordance with an example embodiment of the disclosure. While the previous process to fabricate composite anodes employs a direct coating process, this process physically mixes the active material, conductive additive, and binder together coupled with peeling and lamination processes.

This process is shown in the flow diagram of FIG. 2B, starting with step 221 where the raw electrode coating layer may be mixed to form a slurry with stable viscosities of more than 1500 cp by using water-soluble acidified PAIs (WPAI) and water-based acidic polymer solution additives. The addition of the polymer solution additive enables the adjustment of the viscosity of the polymer and homogenization of the slurry.

The particle size and mixing times may be varied to configure the electrode coating layer density and/or roughness. Furthermore, cathode electrode coating layers may be mixed in step 221, where the electrode coating layer may comprise lithium cobalt oxide (LCO), lithium iron phosphate (LFP), lithium nickel cobalt manganese oxide (NMC), Ni-rich lithium nickel cobalt aluminum oxide (NCA), lithium manganese oxide (LMO), lithium nickel manganese spinel, LFP, Li-rich layer cathodes, LNMO or similar materials or combinations thereof, mixed with carbon precursor and additive as described above for the anode electrode coating layer.

In an example embodiment, for a silicon-dominant anode, 30-40 grams of dry WPAI, 15-25 grams of a basic amine such as butyldiethanolamine or triethanolamine, and 400-500 grams of water may be mixed at high temperature to form a solution. Then, 30-50 grams of this solution may be mixed with 5-20 grams of silicon microparticles (~10-12 μm) plus 0.2-0.5 grams of PAA 12% solution in water as additive, and 4-8 grams of water. The mixture may be mixed using a low shear mixer or a centrifugal speed mixer, where FIG. 3 shows the changes in the viscosity of the solution versus mixing time.

In step 223, the slurry may be coated on a polymer substrate, such as polyethylene terephthalate (PET), polypropylene (PP), or Mylar. The slurry may be coated on the PET/PP/Mylar film at a loading of 3-6 mg/cm$^2$ for the anode and 15-35 mg/cm$^2$ for the cathode, and then dried in step 225. An optional calendering process may be utilized where a series of hard pressure rollers may be used to finish the film/substrate into a smoothed and denser sheet of material.

In step 227, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 229 where the film may be cut into sheets, and vacuum dried using a two-stage process (100-140° C. for 14-16 hours, 200-240° C. for 4-6 hours). The dry film may be thermally treated at 1000-1300° C. to convert the polymer matrix into carbon.

In step 231, the pyrolyzed material may be flat press or roll press laminated on the current collector, where for aluminum foil for the cathode and copper foil for the anode may be pre-coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the active material composite film may be laminated to the coated aluminum or copper using a heated hydraulic press (30-70 seconds, 250-350° C., and 3000-5000 psi), thereby forming the finished composite electrode. In another embodiment, the pyrolyzed material may be roll-press laminated to the current collector.

In step 233, the electrodes may then be sandwiched with a separator and electrolyte to form a cell. The cell may be subjected to a formation process, comprising initial charge and discharge steps to lithiate the anode, with some residual lithium remaining, and testing to assess cell performance.

FIG. 3 illustrates slurry viscosity versus mixing time, in accordance with an example embodiment of the disclosure. The plot indicates that a slurry with stable viscosity can be achieved using WPAI as the carbon precursor, where a viscosity of 1500 centipoise (cp) may be obtained after ~15 hours with this mixture. The polymer additive may play a role in linking long chain PAIs together and as a result increases the viscosity of the solution.

Figure 4:
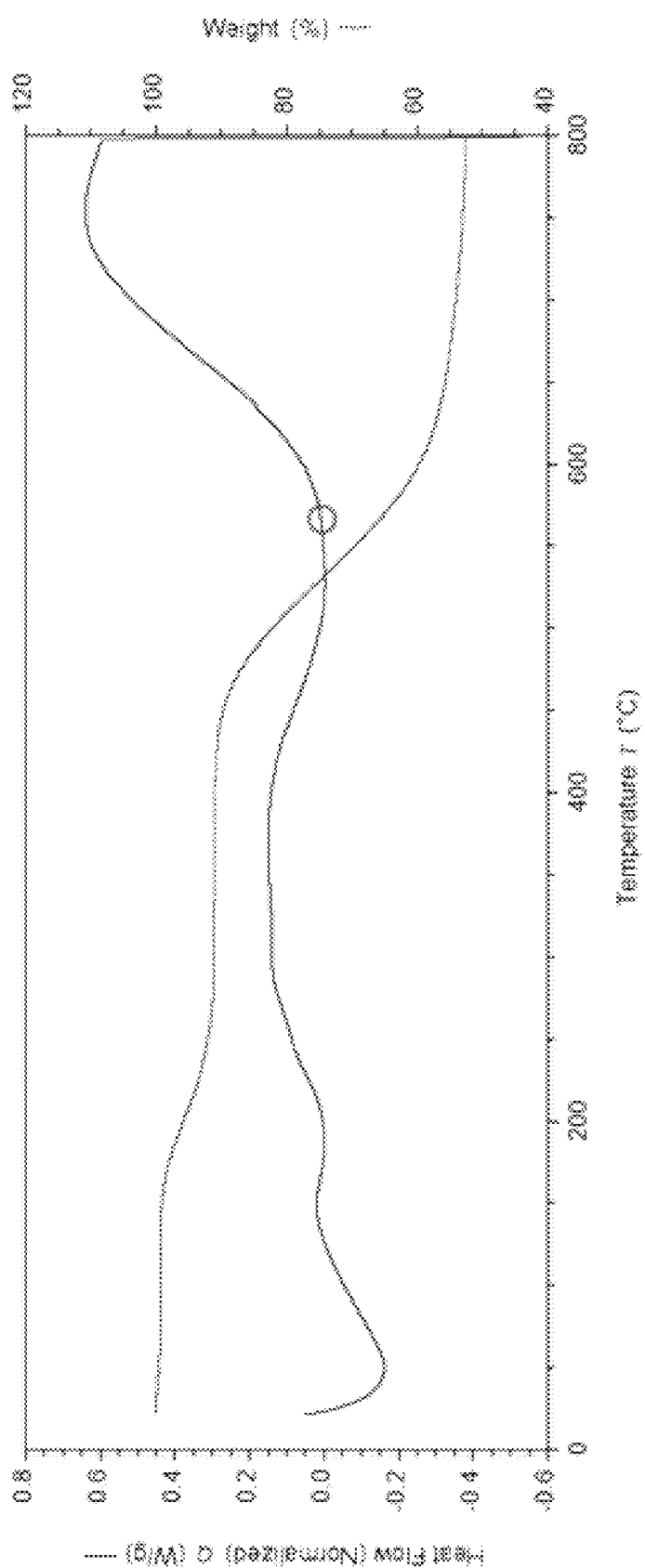
FIG. 4 illustrates the results of thermal gravimetric analysis (TGA) of dry WPAI, in accordance with an example embodiment of the disclosure.

FIG. 4 illustrates the results of thermal gravimetric analysis (TGA) of dry WPAI, in accordance with an example embodiment of the disclosure. The TGA analysis may be performed under nitrogen atmosphere with a flow rate of 100 sccm and temperature ramp rate of 5° C./min. The plot shows the weight percentage remaining and the normalized heat flow provided to the material in W/g over a temperature range up to 800° C. The TGA analysis indicates that the polymer has ~58% char yield at 650° C. and more than 53% char yield at 800° C.

Figure 5:
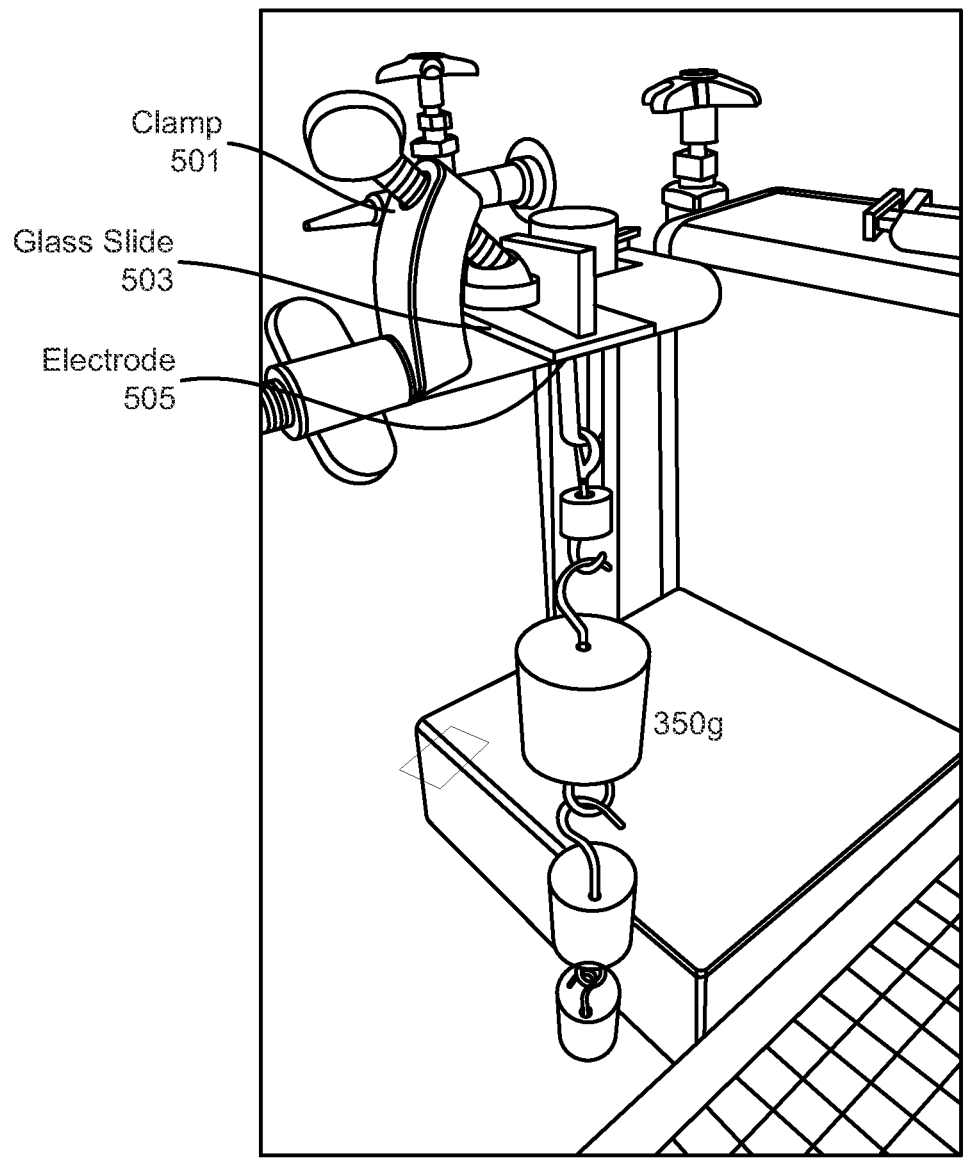
FIG. 5 illustrates an adhesion test for a silicon-dominant anode with water-soluble acidified PAI and water-based acidic polymer solution additive, in accordance with an example embodiment of the disclosure.

FIG. 5 illustrates an adhesion test for a silicon-dominant anode with water-soluble acidified PAI and water-based acidic polymer solution additive, in accordance with an example embodiment of the disclosure. The test setup includes a clamp 501 for holding an electrode 505 fastened to a glass slide 503 using adhesive tape (not visible) holding the anode on one side on the other is a double sided adhesive tape (not visible) for coupling to weights.

The anode shows a superior adhesion strength, with capability of holding 350 grams of weights before the coating detaches from the copper. Such adhesion is much higher than most anodes which mostly fail to hold more than 50 grams of weights.

Figure 6:
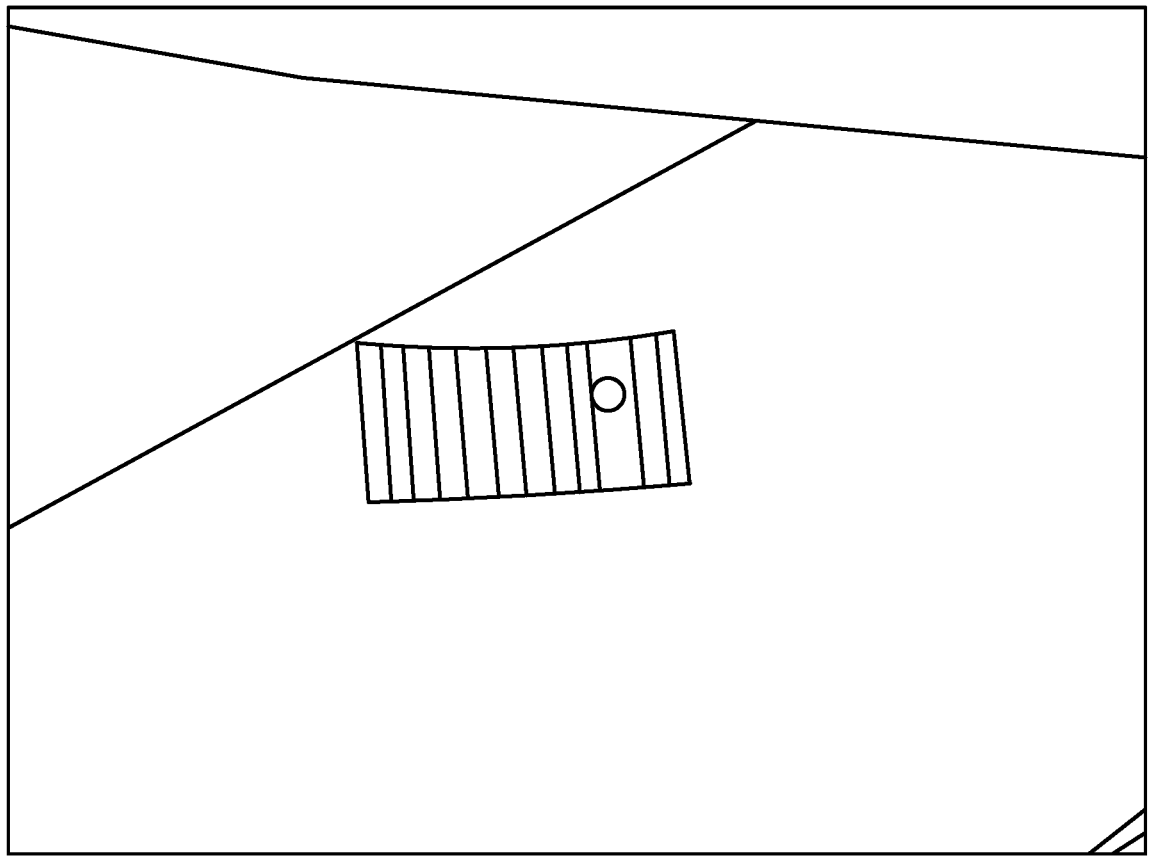
FIG. 6 illustrates a silicon-dominant anode after a winding test, in accordance with an example embodiment of the disclosure.

FIG. 6 illustrates a silicon-dominant anode after a winding test, in accordance with an example embodiment of the disclosure. In this example, the anode is wrapped around a 4 mm mandrel in order to test the feasibility of using it for cylindrical cells. As it can be seen from FIG. 6, the anode shows only minor cracks, no copper exposures due to carbon detachments, and no flaking. Therefore, such a remarkable flexibility and anode integrity indicates that the water-based slurry anode is appropriate for use in cylindrical cells.

Figure 7:
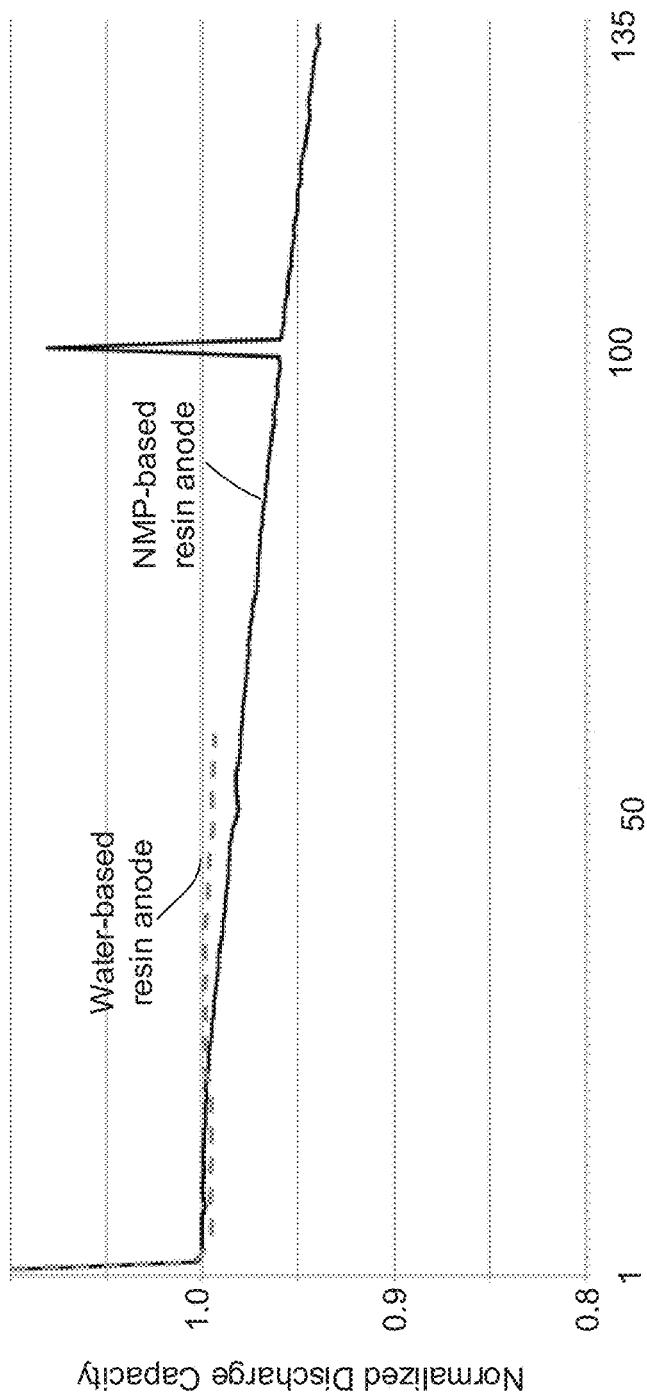
FIG. 7 illustrates normalized discharge capacity of a cell with water-soluble acidified PAI and water-based acidic polymer solution additive anode compared to a standard cell with NMP-based slurry laminated anode, in accordance with an example embodiment of the disclosure.

FIG. 7 illustrates normalized discharge capacity of a cell with water-soluble acidified PAI and water-based acidic polymer solution additive anode compared to a standard cell with NMP-based resin laminated anode, in accordance with an example embodiment of the disclosure. The plot compares the normalized capacity retention of the standard anode (solid line—anode laminated on a current collector with an adhesive) versus the water-soluble acidified PAI and water-based acidic polymer solution additive anode (dashed line). The NMP-based resin anode may be laminated on a copper foil coated with PAI adhesive, as opposed to the direct-coated water-based resin anode.

While the absolute capacity values indicate that both anodes have similar capacities, the normalized capacity values shown indicate that the water-soluble acidified PAI anode demonstrates a better capacity retention compared with the standard anode. The standard anode in this example is a free standing pyrolyzed coupon that is laminated on adhesive-coated copper. As can be seen in FIG. 7, the water-soluble acidified PAI anode is still at near 100% discharge capacity after 60 cycles. In addition to improved cycle life, water-soluble acidified PAI and water-based acidic polymer solution additive anodes demonstrate increased energy density, increased power density, improved flexibility, improved adhesion, and reduced cost using water soluble acidified PAI.

FIG. 8 illustrates slurry viscosity against temperature for a sample containing silicon powder with D50 of 5 μm at 20.92%, PAI-resin at 66.90%, Polyacrylic acid (12% in water)-PAA at 12.07% and surfactant at 0.10%, at 60 and 100 RPM.

FIG. 9 illustrates electrochemical performance of the anodes in pouch cells, where the anodes are made from slurries according to Samples 1-3 above. The cycling may be performed at 2 C charge and 0.5 C discharge between 4.2-2.5V.

Further Examples and Embodiments

The following provides further examples and/or embodiments of silicon-dominant anodes and processes for manufacturing such silicon-dominant anodes. In the interest of brevity, the silicon-dominate anodes are described below as being manufactured per the direct coating process of FIG. 2A. However, each of the below silicon-dominant anodes may be manufactured per the direct coating process of FIG. 2A or the laminating process of FIG. 2B.

A silicon-dominate anode was prepared based on the following slurry formulation, which is presented in mass units in Table 3 and as weight percentages in Table 4:

TABLE 3

| | |
|---|---|
| Silicon powder | 10.461 g |
| PAI solution in DI water (6%) | 33.457 g |
| Polyacrylic acid solution in water (12%) | 6.037 g |
| Surfactant | 0.045 g |

TABLE 4

| | |
|---|---|
| Silicon powder | 20.9% |
| PAI solution in DI water (6%) | 66.9% |
| Polyacrylic acid solution in water (12%) | 12.1% |
| Surfactant | 0.1% |

In particular, the slurry was formed at 201 of FIG. 2A from the above components by adding the surfactant and PAI solution to a mixer. The mixer mixed the surfactant and PAI solution at 2000 rpm for 1 minute. The silicon powder was then added to the mixer and mixed at 2000 rpm for another minute. Then, the PAA solution was added to the mixer and mixed at 2000 rpm for another minute. At which point, the mixture was filtered through a 120 μm mesh to remove agglomerates and returned to the mixer. The mixer further mixed the slurry at 2000 rpm for a minute and then at 2200 rpm for another minute.

At 203, the slurry was coated on a foil. In particular, the slurry was hand coated using a 9 mil doctor blade on one side of a 20 μm copper foil. In particular, the copper foil was a rolled copper foil made of C15500 alloy and the slurry was applied to a thickness of about 30 μm, resulting in a copper foil to active material thickness ratio of about 0.66 (20 μm/30 μm). Some embodiments may utilize a copper foil made of C15500, C19400, C26000, or C51000 copper alloys.

At 205, the slurry coated copper foil was dried at about 90° C. in a gravity convection oven for 10 to 15 minutes, then slit into 2-inch wide anode stripes. The anode stripes were further dried at 80° C. under vacuum overnight before calendering. At 207, the anode stripes were calendered using a fixed gap calendering machine at 60° C. to reach designed thickness of 50-65 μm including 20 μm Cu foil and density of approximately 1.0-1.1. After calendering, the anode stripes were punched to form anode coupons and the anode coupons at 209 were pyrolyzed at 650° C. with 5° C./min ramp and 180 minute dwell time in an Argon atmosphere. Such process resulted in single-side anodes having an active material layer of about 30 μm on one side of the copper foil. The final composition of the anode active material after pyrolysis was about 86% silicon and about 14% pyrolytic carbon. Moreover the active material had a porosity of about 50-56%.

Some embodiments of a silicon-dominant anode may utilize a foil thickness to active material layer thickness of over 0.5, wherein the porosity of the active material layer is below 70%. Some embodiments of a silicon-dominant anode may utilize a foil thickness to active material layer thickness of 0.15, about 0.15, over 0.15, 0.25, about 0.25, over 0.25, 0.5, about 0.5, over 0.5, 0.66, about 0.66, or over 0.66, wherein the porosity of the active material layer is 70%, about 70%, below about 70%, 60%, about 60%, below about 60%, 50%, about 50%, below about 50%, 40%, about 40%, below about 40%, 30%, about 30%, or below about 30%.

Moreover, some embodiments of a silicon dominant anode may utilize a foil thickness to porosity-adjusted active material layer thickness ratio of 0.25, about 0.25, over 0.25, 0.33, about 0.33, over 0.33, 0.5., about 0.5, over 0.5, 0.6, about 0.6, over 0.6, 1, about 1, over 1, 1.3, about 1.3, or over 1.3. Such ratio may be calculated per Equation 1:

$$\frac{\text{foil thickness}}{\text{active material thickness} \times \left(1 - \frac{\text{porosity in percentage}}{100}\right)} \quad \text{Equation 1}$$

Single-layer pouch cells were then constructed from the single-sided anodes. In particular, each pouch cell included one single-layer anode, one double layer cathode, and about 1 mL of electrolyte, providing an approximate capacity of 78 mAh. The cathode facing pouch side was taped using Kapton tape to avoid/minimize electrochemical reactions. Each single-layer pouch cell was subject to a hot pressing step, a cold pressing step, or skipped the pressing step, before going through formation and degassing. Afterwards, each single-layer pouch cell was clamped between a bottom metal plate and top metal plate and tested in a battery tester. In particular, each single-layer cell was clamped in the order of a bottom metal plate, paper, cell, foam pad, top metal plate using fixed gap.

Some embodiments of the single-layer pouch cells may be assembled using a fixture where the pressure is maintained by clamping the cell at a certain gap or using springs, actuators or other means to achieve a pressure within about 10%, about 11%, about 15%, or about 20% of original pressure (about 120 kPa). In some embodiments, the pressure may be applied using compressible foam, metal springs, air bladder, paper, or fabric.

Some embodiments of the single-layer pouch cells may have an electrolyte to Ah ratio of about 2 g/Ah, over 2 g/Ah, about 2.4 g/Ah, over 2.4 g/Ah, about 5 g/Ah, over 5 g/Ah, about 10 g/Ah, over 10 g/Ah, about 16 g/Ah, over 16 g/Ah.

Some embodiments of the single-layer pouch cells may be sealed with excess pouch material on at least one side. For example, the seal may be at least 5 mm, at least 3 mm, or at least 2 mm from an edge of the cell stack.

In some embodiments of the single-layer pouch cells, the silicon-dominate anode may have an areal capacity between 9 mAh/cm$^2$ and 15 mAh/cm$^2$. Moreover, the amount of electrolyte per active area of the electrode may be between 0.02 and 0.1 mL/cm$^2$. The active area of the electrode corresponds to the area of the silicon-dominate anode in cm$^2$ that participates in the electrochemical reaction. In some embodiments, the silicon-dominate anode may have an areal capacity between 5 mAh/cm$^2$ and 11 mAh/cm$^2$ with the amount of electrolyte per active area of electrode between 0.005 and 0.05 m L/cm$^2$.

The performance of the single-layer pouch cells were then compared to five-layer pouch cells. Each of the five-layer pouch cells included six layers of double-sided anodes and five layers of double-sided cathodes. The anodes of the five-layer pouch cells were made using the same formulation and mixing method as the single-layer pouch cells. The anodes of the five-layer pouch cells used a 15 µm foil with an active material thickness of about 30 µm on each side, thus resulting in a copper foil to active material thickness ratio of about 0.66 (20 µm/30 20 µm). Each single-layer pouch cell provided 78 mAh measured between 4.2 V and 2.75 V at 0.5 C. Conversely, each five-layer pouch cell provided 780 mAh measured between 4.2 V and 2.75 V at 0.5 C.

Figure 10:
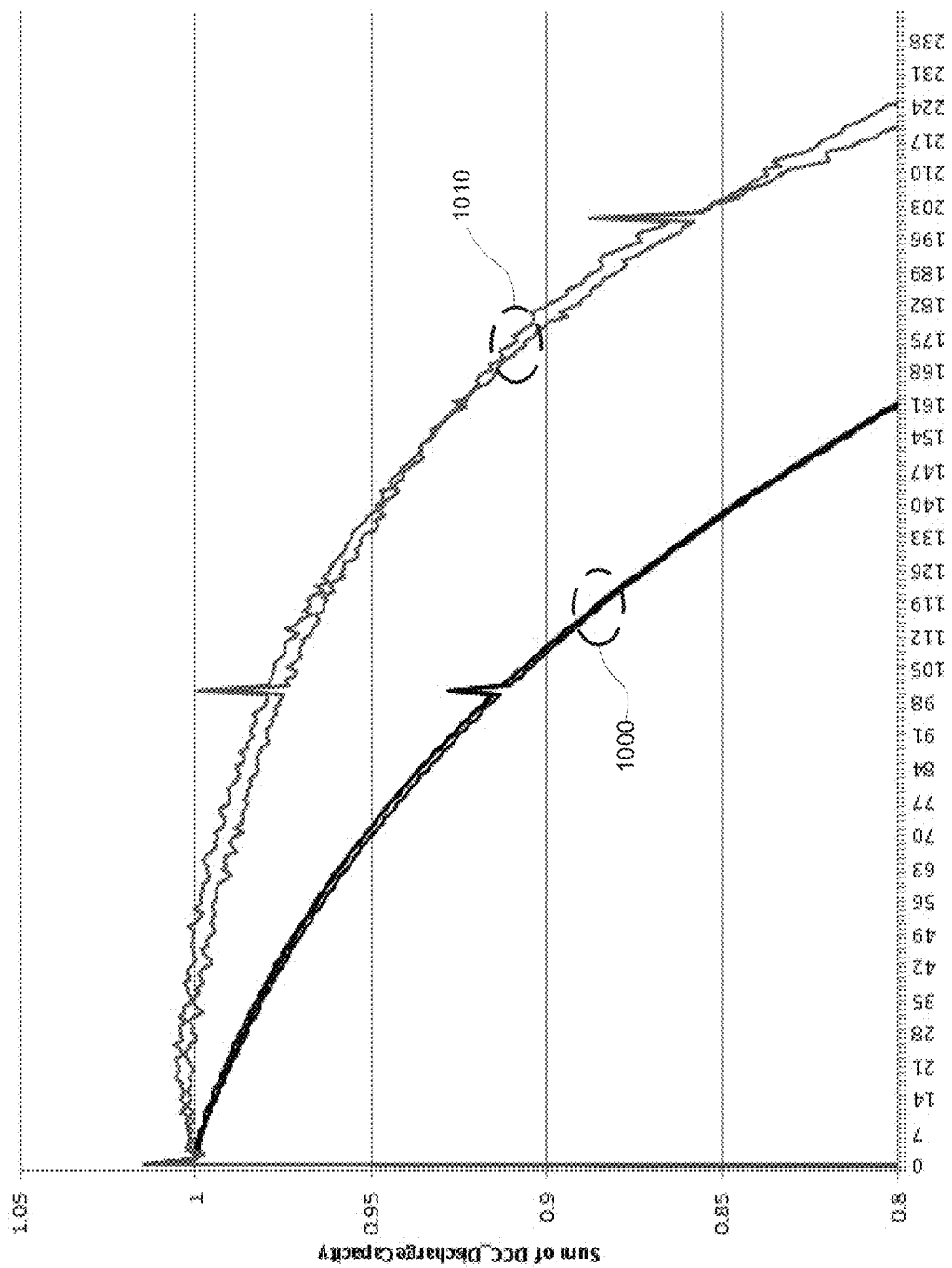
FIG. 10 illustrates capacity retention of single-layer and five-layer pouch cells during cycle life based on 2 C (4.2V)/0.5 C (2.75V) cycles.

Referring now to FIG. 10, capacity retention of single-layer pouch cells (enhanced cells) and five-layer pouch cells (baseline cells) are depicted for cycle life based on 2 C (4.2 V)/0.5 C (2.75 V) cycles. In particular, the enhanced cells and baseline cells of FIG. 10 include anodes manufactured per the formulation of Table 3 and process described above. As shown by lines 1000, the baseline cells reached their 80% retention mark at about 160 cycles. However, as shown by lines 1010, the enhanced cells reached their 80% retention mark at about 220 cycles.

Figure 11:
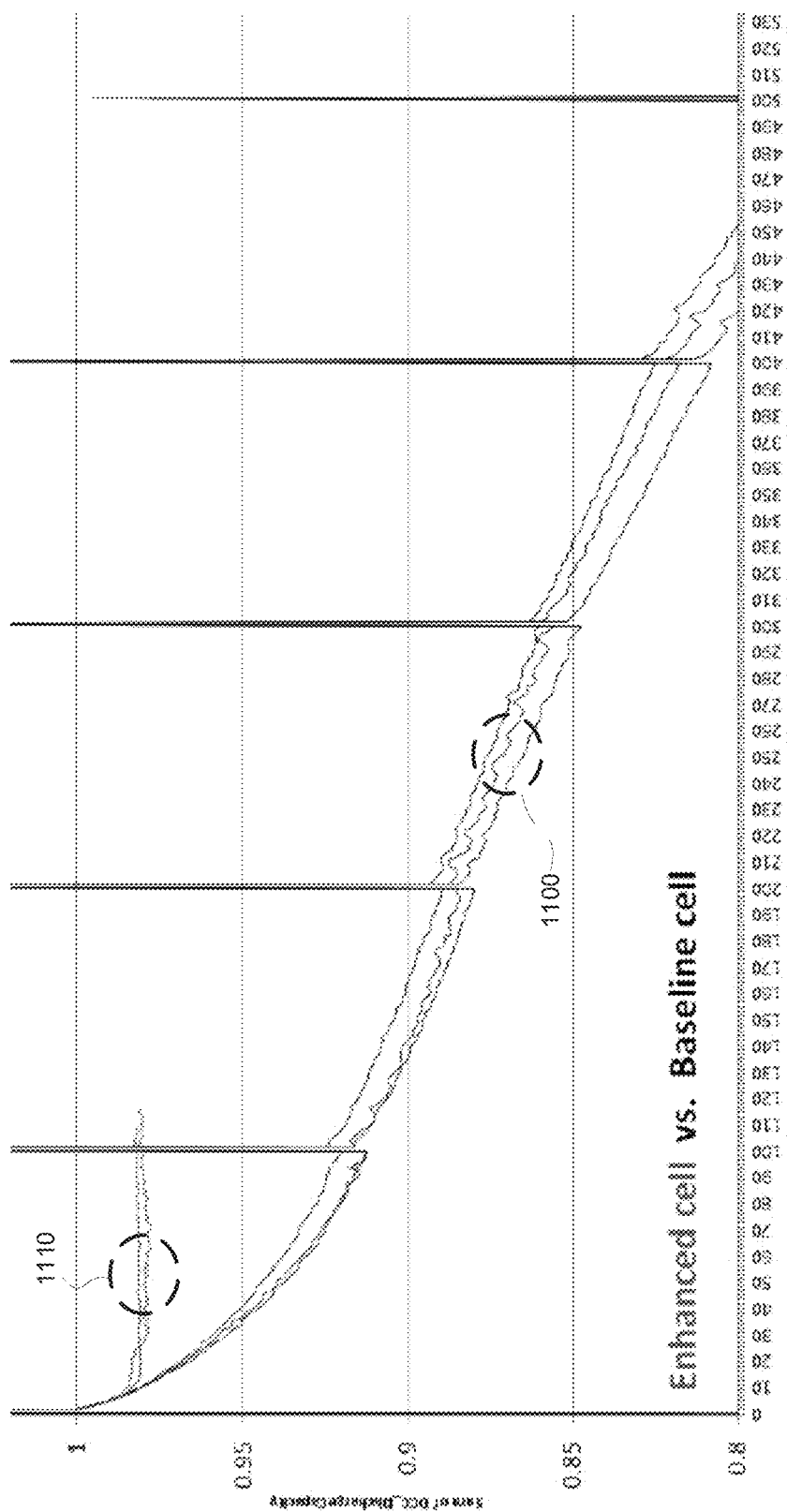
FIG. 11 illustrates capacity retention of single-layer and five-layer pouch cells during cycle life based on 4 C (4.2 V)/0.5 C (3.2 V) cycles.

Referring now to FIG. 11, capacity retention of single-layer pouch cells (enhanced cells) and five-layer pouch cells (baseline cells) are depicted for cycle life based on 4 C (4.2 V)/0.5 C (3.2 V) cycles. In particular, the enhanced cells and baseline cells of FIG. 11 include anodes manufactured per the formulation of Table 3 and process described above. Lines 1100 depict capacity retention of the baseline cells, whereas lines 1110 depict capacity retention of the enhanced cells. As shown, the enhanced cells retained a greater amount of the original capacity after about 120 cycles than the baseline cells.

Figure 12:
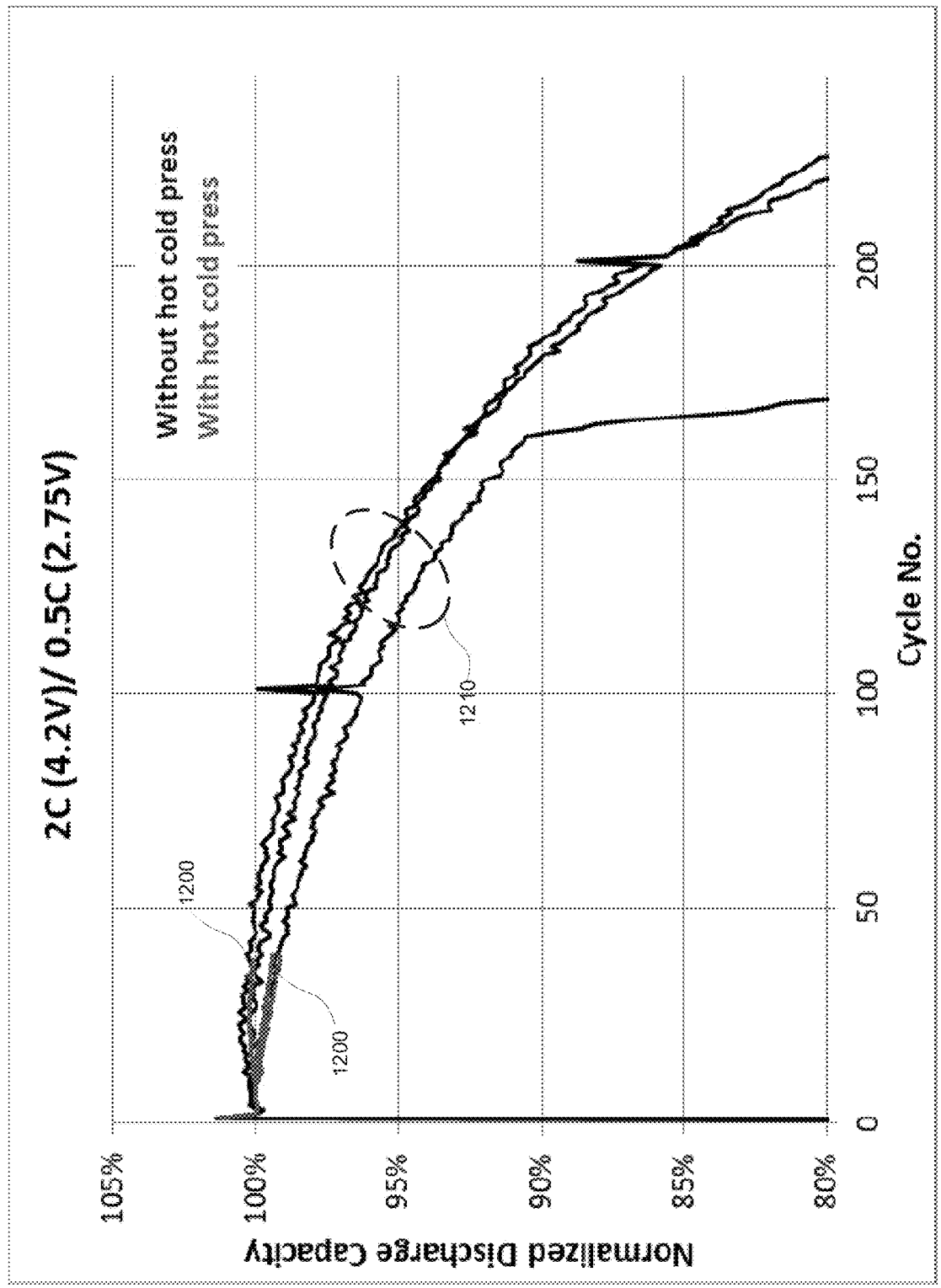
FIG. 12 illustrates capacity retention of pressed and not pressed pouch cells during cycle life based on 2 C (4.2 V)/0.5 C (2.75 V) cycles.

Referring now to FIG. 12, a comparison is presented for capacity retention of pressed and not pressed pouch cells during cycle life based on 2 C (4.2 V)/0.5 C (2.75 V) cycles. In particular, pressed and not pressed pouch cells include anodes manufactured per the formulation of Table 3 and process described above. The pressed cells (shown by lines 1200) include single-layer pouch cells subjected to a hot pressing process in which the cells were pressed at 140 psi at 100° C. for 2 minutes and single-layer pouch cells subject to a cold pressing process in which the cells were pressed at 140 psi at room temperature. The not pressed cells (shown by lines 1210) were not subjected to either hot pressing or cold pressing processes. While a bit difficult to see, the lines 1210 of the not pressed cells closely track the lines 1200 for the pressed cells for the first 30 cycles. FIG. 12 does not include data for the not pressed cells beyond the first 30 cycles. Per FIG. 12, pressing does provide a significant factor of capacity retention for at least the first 30 cycles of cycle life based on 2 C (4.2V)/0.5 C (2.75V) cycles.

Figure 13:
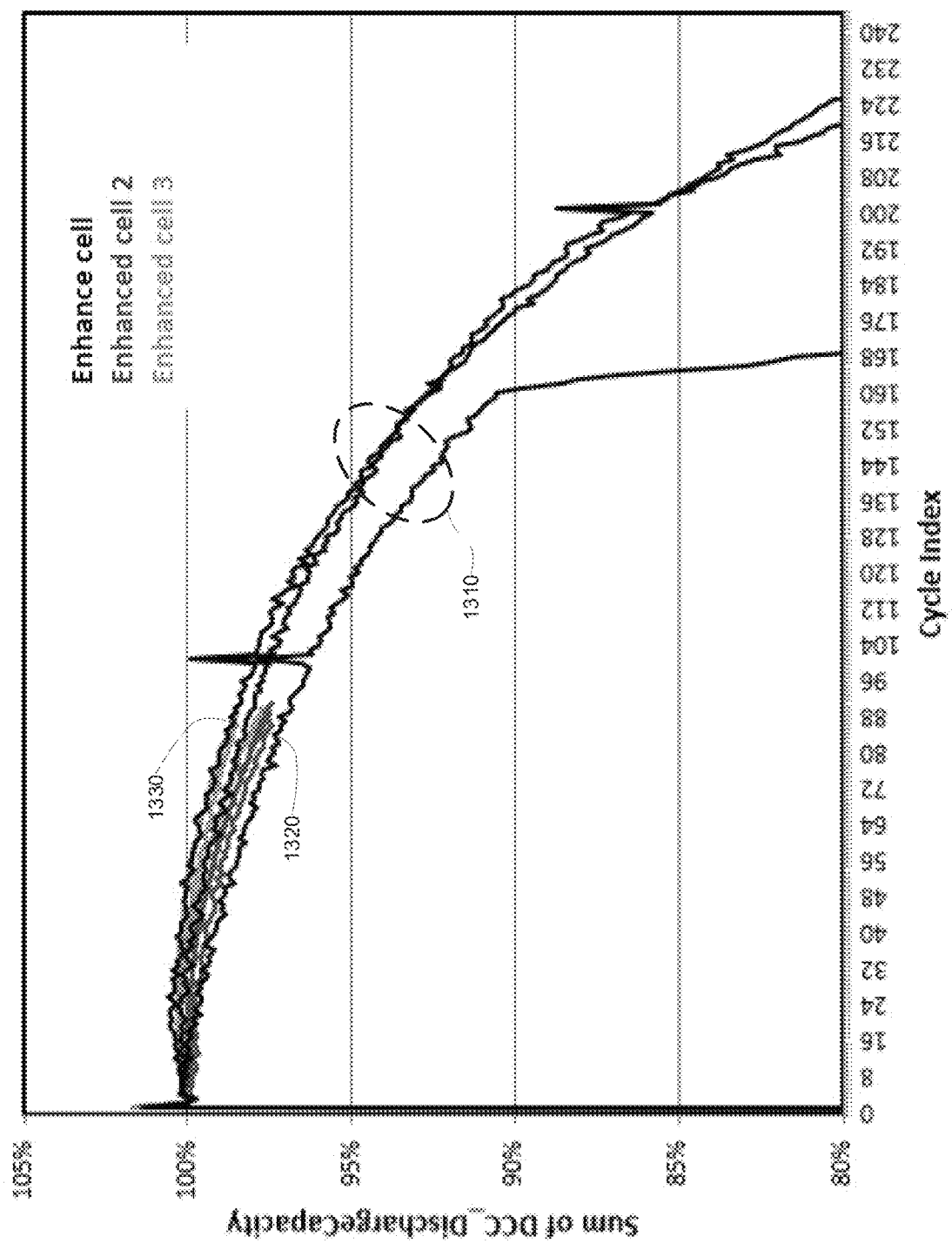
FIG. 13 illustrates capacity retention of single-layer pouch cells having anodes manufacture per three different formulations.

Referring now to FIG. 13, a comparison is presented for capacity retention of single-layer pouch cells having anodes manufactured per three different formulations, which are referred to as enhanced cell, enhanced cell 2, and enhanced cell 3 in FIG. 13. The enhanced cells are represented by lines 1310 in FIG. 13. Each enhanced cell includes an anode manufacture per the formulation of Table 3 and the above described process.

The enhanced cells 2 are represented by lines 1320 in FIG. 13. Each enhanced cell 2 includes an anode manufactured per the formulation of Table 5 and the above described process.

TABLE 5

| | |
|---|---|
| Silicon powder | 29.90% |
| PAI solution (9.5%) in DI water | 69.95% |
| Surfactant | 0.15% |

After pyrolysis, the composition for the anode active material of enhanced cell 2 was about 90% silicon and about 10% pyrolytic carbon. Moreover, the active material of each enhanced cell 2 had a porosity of about 50-56%.

The enhanced cells 3 are represented by lines 1330 in FIG. 13. Each enhanced cell 3 includes an anode manufactured per the formulation of Table 6 and the above described process.

TABLE 6

| | |
|---|---|
| Silicon powder | 34.50% |
| PAI solution (9.5%) in DI water | 64.56 |
| Carbon additives | 0.77% |
| Surfactant | 0.17% |

After pyrolysis, the composition for the anode active material of enhance cell 3 was about 90% silicon, about 8% pyrolytic carbon, and about 2% carbon additive. Moreover, the active material of each enhanced cell 3 had a porosity of about 50-56%.

In view of the above results, the single-layer pouch cells (e.g., enhanced cell, enhanced cell 2, and enhanced cell 3) improve normalized capacity retention by about 50% for 2 C (4.2V)/0.5 C (2.75V) cycling when compared to the five-layer pouch cells (e.g., baseline cells). Moreover, the single-layer pouch cells (e.g., enhanced cell, enhanced cell 2, and enhanced cell 3) reduce degradation by more than a factor of 3 (i.e., has less than ⅓ the degradation) up to about 120 cycles for 4 C (4.2V)/0.5 C (3.2V) cycling when compared to the five-layer pouch cells (e.g., baseline cells).

In an example embodiment of the disclosure, a method and system is described for water soluble weak acidic resins as carbon precursors for silicon-dominant anodes. The battery electrode may comprise an electrode coating layer on a current collector, where the electrode coating layer is formed from silicon and pyrolyzed water-soluble acidic polyamide imide resin carbon precursor. The electrode coating layer may comprise a pyrolyzed water-based acidic polymer solution additive. The polymer solution additive may comprise one or more of: polyacrylic acid (PAA) solution, poly (maleic acid, methyl methacrylate/methacrylic acid, butadiene/maleic acid) solutions, and water soluble PAA. The electrode coating layer may comprise conductive additives. The current collector may comprise a metal foil, where the metal current collector comprises one or more of a copper, tungsten, stainless steel, and nickel foil in electrical contact with the electrode coating layer. The electrode coating layer may comprise more than 70% silicon. The electrode may be in electrical and physical contact with an electrolyte, where the electrolyte comprises a liquid, solid, or gel. The battery electrode may be in a lithium ion battery.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A battery cell comprising:
a cathode;
a separator;
an electrolyte; and
an anode;
wherein the anode comprises a current collector and active material layer on the current collector;
wherein the active material layer comprises at least 50% silicon;
wherein a ratio of the electrolyte to Ah for the battery cell is greater than 2 g/Ah;
wherein the anode has an areal capacity between 9 mAh/cm$^2$ and 15 mAh/cm$^2$; and
wherein the electrolyte comprises 0.02 to 0.1 mL/cm$^2$ of the anode that participates in an electrochemical reaction.

2. The battery cell of claim 1, wherein the ratio of the electrolyte to Ah is greater than 2.4 g/Ah.

3. The battery cell of claim 1, wherein the ratio of the electrolyte to Ah is greater than 5 g/Ah.

4. The battery cell of claim 1, wherein the ratio of the electrolyte to Ah is greater than 10 g/Ah.

5. The battery cell of claim 1, wherein the ratio of the electrolyte to Ah is greater than 16 g/Ah.

6. A battery cell comprising:
a cathode;
a separator;
an electrolyte; and
an anode;
wherein the anode comprises a current collector and active material layer on the current collector;
wherein the active material layer comprises at least 50% silicon;
wherein a ratio of the electrolyte to Ah for the battery cell is greater than 2 g/Ah;
wherein the anode has an areal capacity between 5 mAh/cm$^2$ and 11 mAh/cm$^2$; and
wherein the electrolyte comprises 0.005 to 0.05 mL/cm$^2$ of the anode that participates in an electrochemical reaction.

7. The battery cell of claim 1, wherein a porosity of the active material layer is less than 70%.

8. The battery cell of claim 1, wherein a porosity of the active material layer is less than 60%.

9. The battery cell of claim 1, wherein a porosity of the active material layer is less than 50%.

10. The battery cell of claim 1, wherein a porosity of the active material layer is less than 40%.

11. The battery cell of claim 1, wherein a porosity of the active material layer is less than 30%.

12. The battery cell of claim 1, wherein a second ratio of a thickness of the current collector to a thickness of the active material layer is greater than 0.5.

13. The battery cell of claim 1, wherein a second ratio of a thickness of the current collector to a thickness of the active material layer is greater than 0.66.

14. The battery cell of claim 1, wherein a second ratio of a thickness of the current collector to a porosity-adjusted active material layer thickness of the active material layer is greater than 0.25.

15. The battery cell of claim 1, wherein a second ratio of a thickness of the current collector to a porosity-adjusted active material layer thickness of the active material layer is greater than 0.33.

16. The battery cell of claim 1, wherein a second ratio of a thickness of the current collector to a porosity-adjusted active material layer thickness of the active material layer is greater than 0.5.

17. The battery cell of claim 1, wherein a second ratio of a thickness of the current collector to a porosity-adjusted active material layer thickness of the active material layer is greater than 0.6.

18. The battery cell of claim 1, wherein a second ratio of a thickness of the current collector to a porosity-adjusted active material layer thickness of the active material layer is greater than 1.

19. The battery cell of claim 1, wherein a second ratio of a thickness of the current collector to a porosity-adjusted active material layer thickness of the active material layer is greater than 1.3.

20. The battery cell of claim 1, wherein the active material layer further comprises a pyrolyzed binder.

21. The battery cell of claim 6, wherein the ratio of the electrolyte to Ah is greater than 2.4 g/Ah.

22. The battery cell of claim 6, wherein the ratio of the electrolyte to Ah is greater than 5 g/Ah.

23. The battery cell of claim 6, wherein the ratio of the electrolyte to Ah is greater than 10 g/Ah.

24. The battery cell of claim 6, wherein the ratio of the electrolyte to Ah is greater than 16 g/Ah.

25. The battery cell of claim 6, wherein a porosity of the active material layer is less than 70%.

26. The battery cell of claim 6, wherein a porosity of the active material layer is less than 60%.

27. The battery cell of claim 6, wherein a porosity of the active material layer is less than 50%.

28. The battery cell of claim 6, wherein a porosity of the active material layer is less than 40%.

29. The battery cell of claim 6, wherein a porosity of the active material layer is less than 30%.

30. The battery cell of claim 6, wherein a second ratio of a thickness of the current collector to a thickness of the active material layer is greater than 0.5.

31. The battery cell of claim 6, wherein a second ratio of a thickness of the current collector to a thickness of the active material layer is greater than 0.66.

32. The battery cell of claim 6, wherein a second ratio of a thickness of the current collector to a porosity-adjusted active material layer thickness of the active material layer is greater than 0.25.

33. The battery cell of claim 6, wherein a second ratio of a thickness of the current collector to a porosity-adjusted active material layer thickness of the active material layer is greater than 0.33.

34. The battery cell of claim 6, wherein a second ratio of a thickness of the current collector to a porosity-adjusted active material layer thickness of the active material layer is greater than 0.5.

35. The battery cell of claim 6, wherein a second ratio of a thickness of the current collector to a porosity-adjusted active material layer thickness of the active material layer is greater than 0.6.

36. The battery cell of claim 6, wherein a second ratio of a thickness of the current collector to a porosity-adjusted active material layer thickness of the active material layer is greater than 1.

37. The battery cell of claim 6, wherein a second ratio of a thickness of the current collector to a porosity-adjusted active material layer thickness of the active material layer is greater than 1.3.

38. The battery cell of claim 6, wherein the active material layer further comprises a pyrolyzed binder.

* * * * *